United States Patent [19]
Fricker et al.

[11] 3,740,631
[45] June 19, 1973

[54] VOLTAGE COMPARATOR CONTROLLED MOTOR STARTING CIRCUIT

[75] Inventors: David C. Fricker, Hurst; Thomas F. Whittaker, Fort Worth; Leon Fink, Jr., Arlington; Stephen K. Lam, Dallas, all of Tex.

[73] Assignee: ECC Corporation, Euless, Tex.

[22] Filed: July 23, 1971

[21] Appl. No.: 165,670

[52] U.S. Cl. .............................. 318/221 E, 318/227
[51] Int. Cl. ............................................. H02p 1/44
[58] Field of Search ................... 318/221 E, 221 R, 318/227

[56] References Cited
UNITED STATES PATENTS

| | | | |
|---|---|---|---|
| 3,421,064 | 1/1969 | Phillips | 318/221 E |
| 3,538,411 | 11/1970 | Knauer et al. | 318/221 E |
| 3,489,969 | 1/1970 | Knauer et al. | 318/221 E |

Primary Examiner—Gene Z. Rubinson
Attorney—Giles C. Clegg, Jr., Calvin E. Thorpe and Richard E. Bee et al.

[57] ABSTRACT

A speed responsive motor starting circuit includes a pair of bilateral triode switches connected to the motor start system for controlling the current flow therethrough. A capacitor is connected to the control electrode of one of the triode switches for supplying enabling current thereto. Current supplied to the capacitor by an A. C. supply, the amount supplied being controlled by a comparator switch in accordance with the relative magnitudes of two voltages applied to the comparator switch. One such voltage is inversely proportional to the speed of the motor and is generated by a current-sensing transformer coupled in circuit with the motor run winding. The other such voltage is applied by the A. C. supply through a diode to the comparator switch. Various solid state devices may be utilized as the comparator switch.

19 Claims, 8 Drawing Figures

Patented June 19, 1973
3,740,631
2 Sheets-Sheet 1
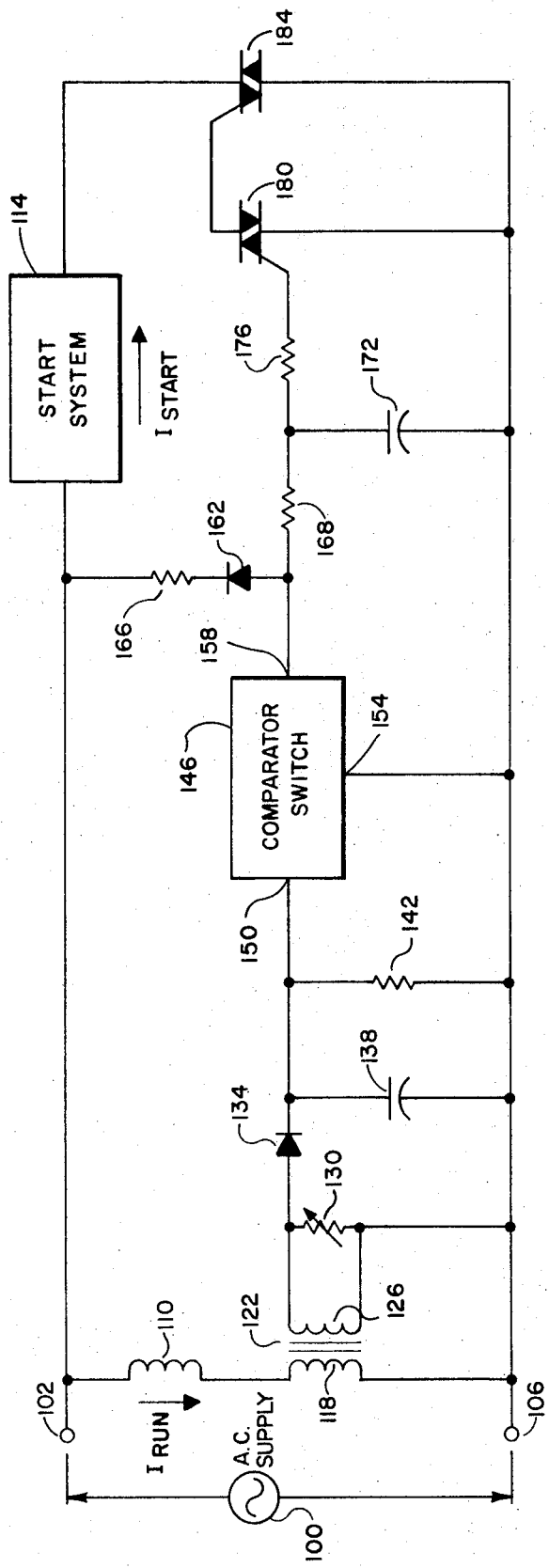
FIG. 1
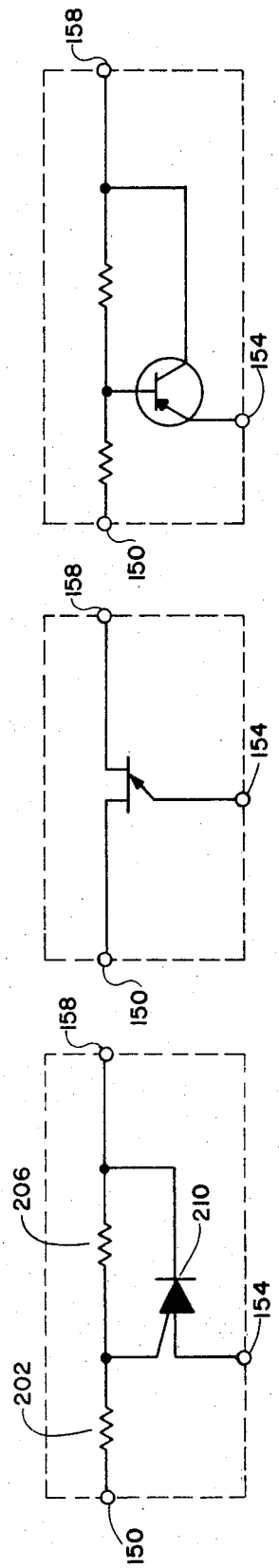
FIG. 4
FIG. 3
FIG. 2

VOLTAGE COMPARATOR CONTROLLED MOTOR STARTING CIRCUIT

BACKGROUND OF THE INVENTION

The present invention relates to speed responsive motor starting circuits and, more particularly, to a motor starting circuit adapted for use in nearly all types of A. C. induction motors.

Solid state motor starting circuits generally utilize either resistive sensing or transformer sensing to determine the speed of the motor so that when a certain speed is reached, the starting system or start winding is disconnected from the A. C. supply. With such circuits, the decision of whether to connect or disconnect the start winding is generally made at or near the beginning of each half cycle of the A. C. wave. In order to provide full torque to the motor's rotor upon starting, it is necessary that the decision of whether to connect or disconnect the start winding be made rapidly and, if the decision is to connect, that the start winding be connected at the beginning of each half cycle. Otherwise, of course, the start winding would not receive full power during the starting phase. To ensure that the start winding is connected at the beginning of each half cycle during the start phase, it is necessary that the starting circuit be synchronized with the current applied to the start winding; this ordinarily requires that the starting circuit include some type of phase compensation circuitry. However, a motor starting circuit having phase compensation circuitry suitable for one type of motor may be inefficient if used in another type of motor since the phase angle of the current applied to the start winding of the other type of motor may be different from the phase angle of the motor for which the circuit was designed. In other words, solid state motor starting circuit of the type described above are generally useful only with a motor of the type for which they are specifically designed or at least only with motors having similar phase angle characteristics.

SUMMARY OF THE INVENTION

It is an object of the invention to provide a motor starting circuit which may be efficiently employed in all types of motors.

It is also an object of the present invention to provide a motor starting circuit which operates substantially independently of the phase angle characteristics of the motor in which it is used.

It is another object of the present invention to provide a motor starting circuit which delivers full power to the start winding regardless of the phase angle of the start winding current.

It is still a further object of the present invention to provide a new and improved solid state speed responsive motor starting circuit.

These and other objects of the present invention are realized in a specific illustrative motor starting circuit which includes switching apparatus for connecting or disconnecting a motor starting system with or from an A. C. supply in accordance with a control current applied to the switching apparatus. The circuit also includes a current-sensing transformer responsive to current in a motor run winding for generating a first direct current voltage. A comparator switch causes enabling current to be supplied to the switching apparatus in accordance with the relative amplitudes of the first voltage and a second direct current voltage generated by circuitry connected to the A. C. supply. The application of enabling current to the switching apparatus is substantially independent of the phase of the current applied to the starting system, and, rather, is dependent only upon the flow of current through the run winding.

BRIEF DESCRIPTION OF THE DRAWINGS

The above and other objects and advantages of the present invention will become more apparent from the following detailed description presented in connection with the accompanying drawings in which:

FIG. 1 shows an illustrative motor starting circuit constructed in accordance with the present invention;

FIG. 2 shows a programmable unijunction transistor embodiment of the comparator switch 146 of FIG. 1;

FIG. 3 shows a unijunction transistor embodiment of the comparator switch 146 of FIG. 1;

FIG. 4 shows a PNP type transistor embodiment of the comparator switch 146 of FIG. 1;

DETAILED DESCRIPTION OF THE DRAWING

Figure 5:
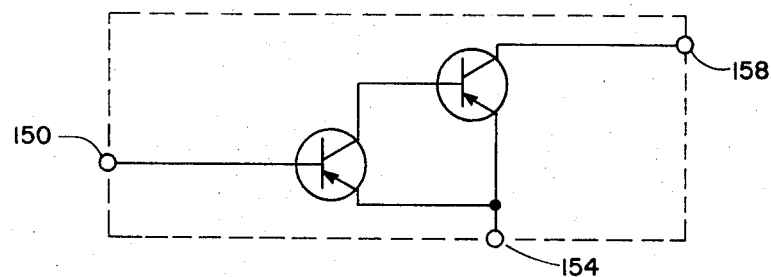
FIG. 5 shows a PNP type transistor darlington-pair configuration embodiment of the comparator switch 146 of FIG. 1.

The circuit shown in FIG. 1 includes a run winding 110 and a start system 114 of a typical alternating current induction motor. Both the run winding 110 and the start system 114 are connected to one terminal 102 of an alternating current power supply 100.

A bilateral triode switch 184 is connected in series with the start system 114, one power electrode of the triode switch 184 being connected to the system 114 and the other power electrode being connected to the other terminal 106 of the alternating current supply 100. The operation of the triode switch 184 is controlled by the flow of current through a second bilateral triode switch 180 to the control electrode of the switch 184. The flow of current through the bilateral triode switch 180 is, in turn, controlled by the current applied to its control electrode via a resistor 176. The resistor 176 is connected to one plate of a current-supply capacitor 172, the other plate of which is connected to the terminal 106. The resistor 176 is also connected via a resistor 168 to a comparator switch 146 and to a diode 162. The diode 162 is connected in series with a resistor 166 to the terminal 102.

The comparator switch 146 includes three nodes 150, 154 and 158, the first of which is connected to a diode 134, a capacitor 138 and a resistor 142, the second of which is connected to the terminal 106, and the third of which, is already indicated, is connected to the resistor 168 and the diode 1 62. The comparator switch 146 serves to control the current supplied via resistor 166 and diode 162 to the resistor 168 and capacitor 172 by either providing an "open" or "closed" path between nodes 158 and 154. The relative amplitudes of the voltages at nodes 150 and 158 determine whether or not the comparator switch 146 provides an open or closed path.

The voltage at node 150 is controlled by current sensing means represented by a current transformer 122. The current transformer 122 includes a first or primary winding 118 connected in series with the motor run winding 110. A second or output winding 126 is coupled to the diode 134 and to the terminal 106. A variable resistor 130 is connected in parallel with the secondary winding 126 and serves to control the amount of current supplied by the transformer 122 to the diode 134. This enables use of the circuit of FIG. 2 with motors over a wide range of power ratings. The operation of the circuit of FIG. 1 will now be described.

Alternating current is applied to terminal 102 and thus to the run winding 110 (terminal 106 is maintained at ground potential). The magnitude of the current $I_{run}$ flowing through the motor run winding 110 varies inversely with the speed of rotation of the motor. When the rotor of the motor is stationary, the current flow is fairly heavy but as the motor picks up speed, the current flow decreases. The current transformer 122 operates to sense the magnitude of the current flowing through the run winding 110 and in response thereto applies a voltage (and current) to the diode 134 which is proportional in magnitude to the magnitude of the run winding current $I_{run}$. This voltage, which is an A. C. voltage is rectified to a D. C. voltage of positive polarity by the diode 134 and applied to the capacitor 138 and, of course, to the node 150. The capacitor 138 is utilized to "store" the voltage applied by the diode 134. The resistor 142 is a so-called "bleeding" resistor for discharging the capacitor 138 at a certain rate. Thus, a D. C. voltage proportional to the magnitude of the run winding current $I_{run}$ is induced at the node 150 of the comparator switch 146.

In the quiescent condition of the circuit of FIG. 1, the comparator switch 146 provides a closed path between nodes 158 and 154. Thus, initially after turning on the motor, any current supplied via the terminal 102, the resistor 166 and the diode 162 to the node 158 will be conducted via the comparator switch 146 to the node 154. (The alternating current supplied via the terminal 102 to the diode 162 is rectified to direct current of negative polarity by the diode.) With the closed path between nodes 158 and 154, the voltage at node 158 is "clamped" to the voltage level at the terminal 106, i.e., to ground potential.

When the voltage level at node 150 reaches a certain magnitude relative to the magnitude of the voltage at node 158, the comparator switch 146 opens the path from node 158 to node 154 so that current supplied via the diode 162 is prevented from flowing to node 154, but rather is applied via the resistor 168 to the capacitor 172 thereby charging the capacitor. The capacitor, in turn, supplies current via a resistor 176 to the control electrode of the bilateral triode switch 180 thereby enabling the switch 184 to conduct current between its power electrodes. With the switch 184 enabled to conduct current, start winding current $I_{start}$ is allowed to flow through the start system 114.

As the motor speed increases, the run winding current $I_{run}$ decreases resulting in a corresponding decrease in the voltage applied via the diode 134 to the capacitor 138. Since the capacitor 138 discharges via the resistor 142, the voltage across the capacitor 138 will decrease in accordance with the decrease in the voltage applied via the diode 134. When the voltage at node 150 reaches a certain level relative to the voltage at node 158, the comparator switch 146 provides a closed path from node 158 to node 154 thereby inhibiting further charging of the capacitor 172 (by conducting current from the diode 162 to node 154). With the inhibition of the further charging of the capacitor 172, the capacitor soon discharges removing the gating current from the control electrode of the bilateral triode switch 180. This, in turn, results in the removal of gating current from the bilateral triode switch 184 disabling the switch from conducting current to the start system 114. The torque for driving the motor is then provided only by the run winding 110.

Figure 6:
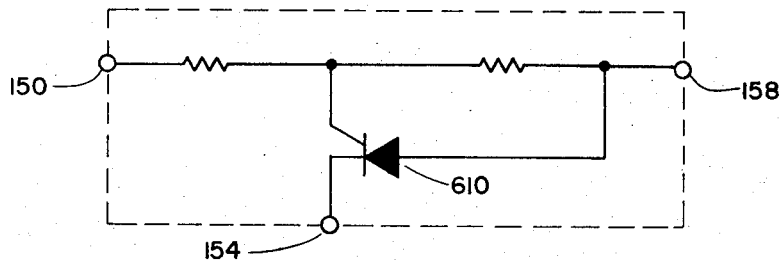
FIG. 6 shows a silicon controlled rectifier embodiment of the comparator switch 146 of FIG. 1.
Figure 7:
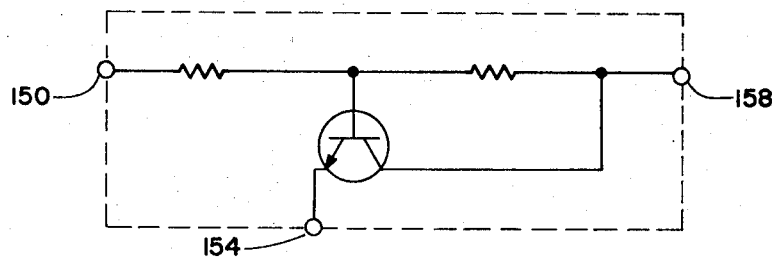
FIG. 7 shows an NPN type transistor embodiment of the comparator switch 146 of FIG. 1.
Figure 8:
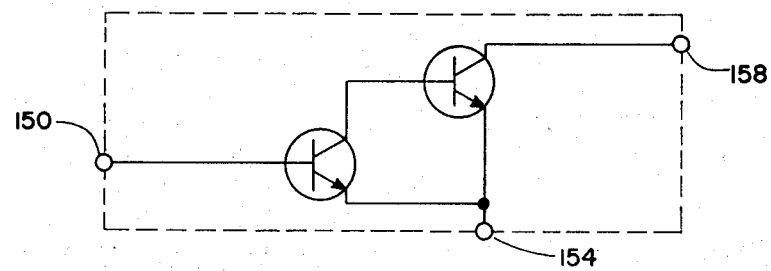
FIG. 8 shows an NPN type transistor darlington-pair configuration of the comparator switch 146 of FIG. 1.

FIGS. 2 through 5 show alternative embodiments for the comparator switch 146. FIGS. 6 through 8 show alternative embodiments for a comparator switch for use in a circuit similar to that of FIG. 1 but modified so that the orientation of the diodes 134 and 162 is reversed, i. e., so that the cathode of the diode 134 is to the left rather than the right of the anode and so that the cathode of the diode 162 is below rather than above the anode.

FIG. 2 shows a programmable unijunction transistor (PUT) embodiment of the comparator switch 146 including a pair of resistors 202 and 206 connected in series an a PUT 210. (The PUT 210 might be of the types produced by General Electric and identified as D13T1 and D13T2.) The nodes 150, 154 and 158 are labeled as they appear in the FIG. 1 drawing. The gate electrode of the PUT 210 is connected to the junction of the resistors 202 and 206. The anode of the PUT 210 is connected to the node 154 and the cathode of the PUT is connected to the node 158. The PUT 210 is placed in a conducting condition (for conducting current between nodes 158 and 154) when the voltage at the gate lead reaches a certain level relative to the voltage at node 154. The voltage level at the gate lead, is in turn determined by the relative voltages at nodes 150 and 158 and by the values of resistors 202 and 206. Specifically, when the voltage at the gate electrode of the PUT 210 becomes more negative than the voltage at the anode, the PUT is placed in a conducting condition.

FIG. 3 shows a unijunction transistor embodiment of the comparator switch of FIG. 1. The voltage drop from node 150 to node 158 relative to the voltage at node 154 determines when the unijunction transistor is triggered to conduct current between node 158 and 154. The operation of unijunction transistors are well known.

FIGS. 4 and 5 show a single transistor embodiment and a so-called darlington-pair transistor configuration respectively of the comparator switch 146 of FIG. 1 utilizing PNP type transistors.

FIG. 6 shows a silicon controlled rectifier (SCR) embodiment of the comparator 146 for use in a circuit similar to that of FIG. 1 but having the diode 134 and 162 reversed in direction. The conductivity of the SCR 610 is determined by the voltage at the gate lead of the SCR relative to the voltage at the cathode of the SCR. Specifically, when the gate lead is more positive than the cathode, the SCR is placed in a conduction condition. The two resistors of FIG. 6 are simply biasing resistors.

The configurations of FIG. 7 and FIG. 8 are simply the NPN transistor counterparts of the configurations of FIGS. 4 and 5 respectively.

Although several specific illustrative embodiments of the invention have been described, it will be obvious to those skilled in the art that various changes and modifications may be made therein without departing from the spirit and scope of the invention. The following claims are intended to cover such changes and modifications.

What is claimed is:

1. In a motor system including a run winding, a starting system, and an A.C. supply, a speed responsive motor starting circuit comprising:

switching means connected in series with said starting system and responsive to gating current for supplying current from said A.C. supply to said starting system;

current sensing means connected in series with said run winding and responsive to the current flowing therethrough for generating a first voltage;

means connected in circuit with said A.C. supply for generating a second voltage; and means for supplying gating current to said switching means in response to said first voltage reaching a certain amplitude relative to the amplitude of said second voltage.

2. The circuit of claim 1 wherein said switching means comprises first and second bilateral triode switches, each having two power electrodes and a control electrode, the power electrodes of said first bilateral triode switch being connected in series with said starting system and the power electrodes of said second bilateral triode switch being connected in series with the control electrode of said first bilateral triode switch to supply gating current thereto.

3. The circuit of claim 1 wherein said current sensing means comprises a transformer having a first winding connected in series with said run winding and a second winding coupled to said supplying means.

4. The circuit of claim 1 wherein said supplying means comprises:

a capacitor connected to said switching means; and
a comparator switch for causing said capacitor to charge when said first voltage reaches a certain amplitude relative to the amplitude of said second voltage.

5. The circuit of claim 4 wherein said comparator switch comprises:

a first resistor connected to said current sensing means;
a second resistor connected to said second voltage generating means and in series with said first resistor; and
a programmable unijunction transistor whose gate electrode is connected to the junction of said first and second resistors, whose cathode is connected to said second voltage generating means, and whose anode is connected to said A. C. supply.

6. The circuit of claim 4 wherein said comparator switch comprises:

a first resistor connected to said current sensing means;
a second resistor connected to said second voltage generating means and in series with said first resistor; and
a silicon controlled rectifier whose gate electrode is connected to the junction of said first and second resistors, whose anode is connected to said second voltage generating means, and whose cathode is connected to said A. C. supply.

7. The circuit of claim 4 wherein said comparator switch comprises a unijunction transistors whose emitter is connected to said A. C. supply and one of whose base electrodes is connected to said current sensing means and the other of whose base electrodes is connected to said second voltage generating means.

8. The circuit of claim 4 wherein said comparator switch comprises:

a first resistor connected to said current sensing means;
a second resistor connected to said second voltage generating means and in series with said first resistors; and
a transistor whose base is connected to the junction of said first and second resistors, whose collector is connected to said second voltage generating means, and whose emitter is connected to said A. C. supply.

9. The circuit of claim 4 wherein said comparator switch comprises:

a first transistor whose base is connected to said current sensing means; and
a second transistor whose base is connected to the collector of said first transistor, whose emitter is connected to the emitter of said first transistor and to said A. C. supply and whose collector is connected to said second voltage generating means.

10. In a motor system including a run winding, a starting system, and an A. C. supply, a speed responsive motor starting circuit comprising:

first and second bilateral triode switches, each having two power electrodes and a control electrode, the power electrodes of said first bilateral triode switch being connected in series with said starting system and the power electrodes of said second bilateral triode switch being connected in series with the control electrode of said first bilateral triode switch for supplying gating current thereto;

a first capacitor coupled to the control electrode of said second bilateral triode switch for supplying gating current thereto;

means connected to a first terminal of said A. C. supply for generating a first voltage;

means connected to said first voltage generating means for charging said first capacitor;

current sensing means responsive to current flowing through said run winding for generating a second voltage;

a second capacitor connected to said current sensing means for storing said second voltage; and a comparator switch for conducting current from said charging means to a second terminal of said A. C. supply in response to certain relative amplitudes of said first and second voltages, to thereby inhibit the charging of said first capacitor.

11. The circuit of claim 10 further comprising a resistive means connecting said second capacitor to said second terminal of said A. C. supply for discharging said second capacitor.

12. The circuit of claim 11 wherein said first voltage generating means includes a resistor and a first diode connected in series for generating a direct current voltage.

13. The circuit of claim 12 further comprising a second diode for applying a direct current voltage from said current sensing means for said second capacitor.

14. The circuit of claim 13 wherein said current sensing means comprising a transformer having a first winding connected in series with said run winding and a second winding connected to said second diode.

15. The circuit of claim 10 wherein said comparator switch comprises:
a first resistor connected to said first capacitor and said current sensing means;
a second resistor connected to said first voltage generating means and said charging means and in series with said first resistor; and
a programmable unijunction transistor whose gate electrode is connected to the junction of said first and second resistors, whose cathode is connected to said first voltage generating means and said charging means, and whose anode is connected to said second terminal of said A. C. supply.

16. The circuit of claim 10 wherein said comparator switch comprises:
a first resistor connected to said second capacitor and said current sensing means;
a second resistor connected to said first voltage generating means and said charging means and in series with said first resistor; and
a silicon controlled rectifier whose gate electrode is connected to the junction of said first and second resistors, whose anode is connected to said first voltage generating means and said charging means, and whose cathode is connected to said second terminal of said A. C. supply.

17. The circuit of claim 10 wherein said comparator switch comprises a unijunction transistor whose emitter is connected to said second terminal of said A. C. supply and one of whose base electrodes is connected to said second capacitor and said current sensing means and whose other base electrode is connected to said first voltage generating means and said charging means.

18. The circuit of claim 10 wherein said comparator switch comprises:
a first resistor connected to said second capacitor and said current sensing means;
a second resistor connected to said first voltage generating means and said charging means; and
a transistor whose base is connected to the junction of said first and second resistors, whose collector is connected to said first voltage generating means and said charging means, and whose emitter is connected to said second terminal of said A. C. supply.

19. The circuit of claim 10 wherein said comparator switch comprises:
a first transistor whose base is connected to said second capacitor and said current sensing means; and
a second transistor whose base is connected to the collector of said first transistor, whose emitter is connected to the emitter of said first transistor and to said second terminal of said A. C. supply, and whose collector is connected to said first voltage generating means and said charging means.

* * * * *